(12) United States Patent
Kent et al.

(10) Patent No.: US 7,146,745 B2
(45) Date of Patent: Dec. 12, 2006

(54) APPARATUS AND PROCESS FOR SERVICING UNDERGROUND ELECTRICAL POWER DISTRIBUTION CABLES

(76) Inventors: Thomas G. Kent, 19030 SW. 264 St., Homestead, FL (US) 33031; Douglas E. Kirk, Sr., 19030 SW. 264 th St., Miami, FL (US) 33031

( * ) Notice: Subject to any disclaimer, the term of this patent is extended or adjusted under 35 U.S.C. 154(b) by 92 days.

(21) Appl. No.: 10/856,146

(22) Filed: May 27, 2004

(65) Prior Publication Data
US 2005/0262722 A1    Dec. 1, 2005

(51) Int. Cl.
F26B 25/00    (2006.01)
H01B 9/06    (2006.01)
H02G 15/02    (2006.01)
H02G 15/013    (2006.01)

(52) U.S. Cl. .................... 34/104; 34/107; 174/25 G; 174/26 G; 174/77 R

(58) Field of Classification Search ................ 34/413, 34/417, 437, 439, 104, 107; 174/24, 25 R, 174/25 G, 25 P, 26 G, 26 R, 77 R
See application file for complete search history.

(56) References Cited

U.S. PATENT DOCUMENTS

| | | | |
|---|---|---|---|
| 2,233,298 A * | 2/1941 | Frederik | ...................... 34/466 |
| 3,252,834 A | 5/1966 | Vincent | |
| 3,368,289 A | 2/1968 | Pelsue | |
| 3,939,882 A | 2/1976 | Gillemot | |
| 4,075,267 A | 2/1978 | Florer | |
| 4,207,685 A | 6/1980 | Pelsue et al. | |
| 4,372,988 A | 2/1983 | Bahder | |
| 4,545,133 A | 10/1985 | Fryszczyn et al. | |
| 4,581,478 A | 4/1986 | Pugh et al. | |
| 4,888,886 A | 12/1989 | Eager, Jr. et al. | |
| 4,945,653 A | 8/1990 | Eager, Jr. et al. | |
| 5,907,128 A | 5/1999 | Lanan et al. | |
| 6,115,937 A * | 9/2000 | Griffioen | ...................... 34/104 |
| 6,176,022 B1 | 1/2001 | Willem | |

* cited by examiner

Primary Examiner—Jiping Lu
(74) Attorney, Agent, or Firm—Malloy & Malloy, P.A.

(57) ABSTRACT

An apparatus and a process of removing moisture in situ from a generally tubular outer insulation jacket about an underground electrical power distribution cable having opposite end zones in combination with a mating terminator in fluid sealing relation on one of the end zones of the cable, the cable including an inner core including a bundle of longitudinal strands of electrically conductive material defining longitudinally extending interstices between the strands, and the core and interstices extending axially through the jacket and having end zones extending axially from the insulation jacket which includes introducing gas at an elevated low pressure relative to ambient pressure directly into the interstices between said conductive strands at one end zone to flow through the interstices within the core without being in direct contact with the outer insulation jacket and out the other end zone of the cable to withdraw moisture and dry the insulation jacket about the core to retard and reduce tree formations in said outer insulation jacket.

18 Claims, 4 Drawing Sheets

APPARATUS AND PROCESS FOR SERVICING UNDERGROUND ELECTRICAL POWER DISTRIBUTION CABLES

FIELD OF THE INVENTION

This invention relates to underground insulated electrical power distribution cables of an installed electrical power distribution network; and, more particularly, to a process and apparatus to extend the useful life of installed cables after they have been determined to have been deleteriously affected by electrochemical type effects caused by moisture in the cables and causing decomposition of the insulation leading to an ultimate failure in the network.

BACKGROUND

In the past there has long been a problem with deterioration of effectiveness of underground insulated electrical distribution cables. The cause of this problem has been traced to moisture from various sources which, over time, causes "tree formations" in the cable insulation with the result that the breakdown voltage level falls below the operating level of the network reducing the expectant life of the network by as much as seventy five percent. This problem is described in substantial detail in U.S. Pat. No. 4,545,133, dated Oct. 8, 1985, which was assigned to the American Power Association. Although the cause of the problem was described in that patent, the apparatus and method to overcome it, which were disclosed in that patent, have not been adopted in the field to any significant extent and, the solution proposed in that patent in any event has not resolved the long outstanding problems in the field.

This invention provides an improved method and apparatus for treating the problem of moisture in underground power cables.

SUMMARY OF THE INVENTION

This invention is of an apparatus and a method which introduces a flow of air or other gas under a low pressure, for example, three or so pounds per square inch higher than the ambient pressure, directly into the interstices or voids between abutting conductor strands of such cable lengths at one of the cable ends so that the air flows in those voids through the entire cable length and out the other end without violating the integrity of the protective outer insulation about the cable inner core, especially the outer cable skin. In so doing moisture is gradually withdrawn and the moisture in the insulation of the cable dries within the cable over time while the cable remains in situ and in use. In this process cable deterioration is reversed and overcome; and the cables do not have to be spliced or replaced with all that attendant expense and effort which those prior type repairs involve. Especially significant is the fact that the integrity of the protective outer skin of the cable is not punctured or in any way compromised in the practice of this disclosure. The text in the aforementioned patent describing the prior problems in the field and the information about them are incorporated herein by reference to avoid an otherwise lengthy specification.

OBJECTS OF INVENTION

It is a general object of this invention to provide a process and apparatus for removing moisture from a generally tubular, outer insulation jacket of an installed underground electrical power distribution cable. The process takes place while the cable remains in the network. The power cable treated by the process is of the type which includes an inner core of a bundle of strands of electrically conductive material of circular cross section which, consequently, defines longitudinally extending interstices between the strands. According to the process, a gas, preferably air, under a relatively low pressure, which is slightly above that of ambient pressure, is introduced into the interstices, or voids, between the strands of the core at one of its end zones. Thus, the flow path extends axially through the cable to the other end and completely through, in other words, along and inside, the outer insulation jacket. The process includes as one main step, the step of introducing the gas directly into the interstices between the conductive strands at one end zone so that it flows through the interstices within the strand core, importantly, without the need of disturbing, puncturing or otherwise violating the protective outer insulation jacket, especially its outer protective skin, to exit from the other end of the cable, which in so doing withdraws moisture and dries moisture accumulations in the insulation jacket about the core. The process may include a heater, or heat boosting means, to elevate the temperature of the gas flow and shorten the operation period of the process.

DESCRIPTION OF PREFERRED EMBODIMENTS

Figure 1:
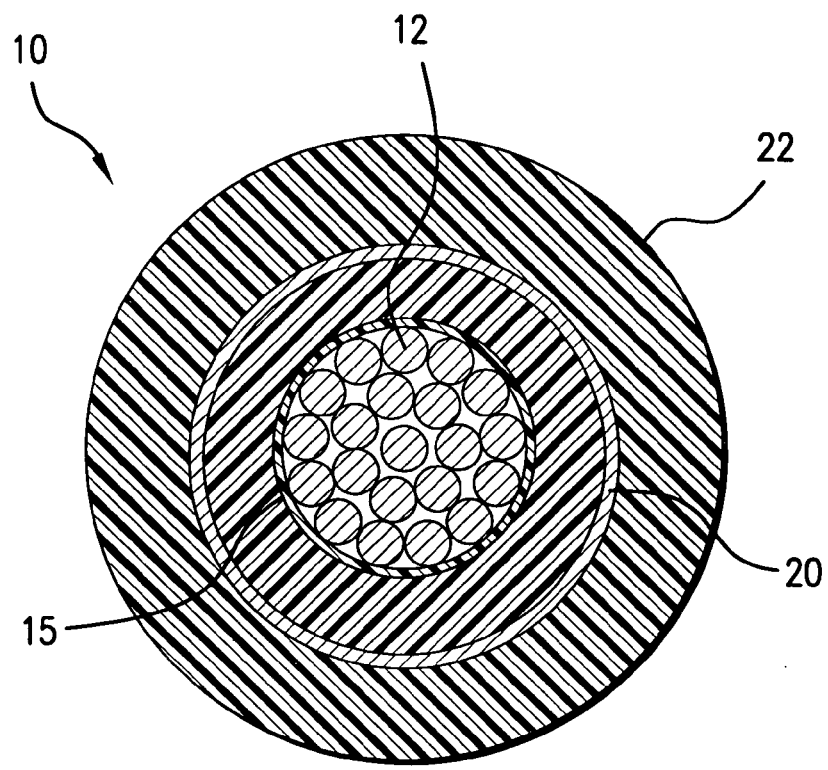
FIG. 1 is a view in cross section of a cable to be treated in accordance with the invention.
Figure 2:
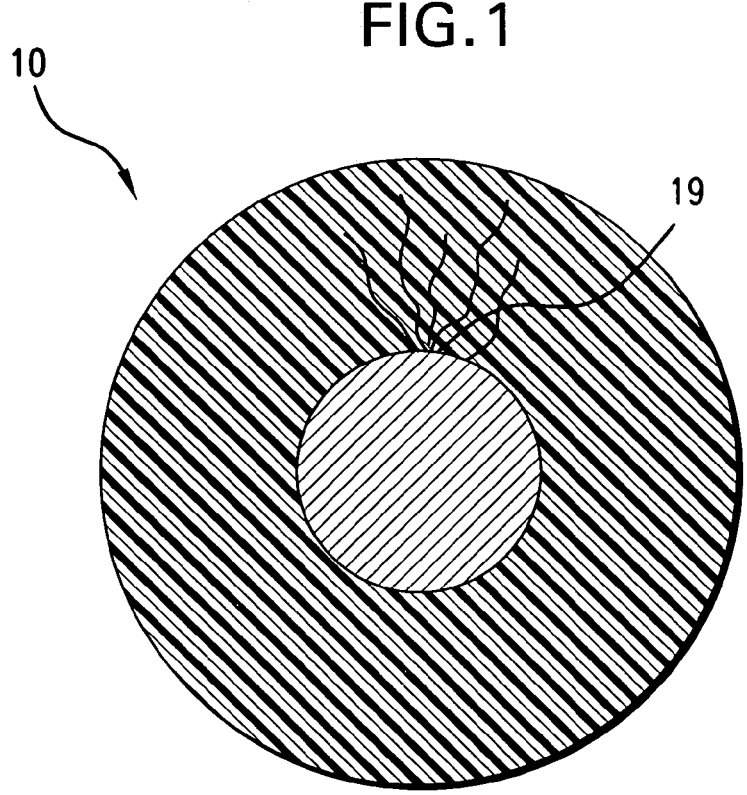
FIG. 2 is a pictorial representation of an objectionable "tree formation" caused by a moisture in a power cable outer insulation jacket and described in detail in U.S. Pat. No. 4,545,133.

Referring to FIG. 1, an underground insulated electrical power distribution cable 10 is shown which is of the type which is often determined to be subject to damage from moisture. It is depicted in a cross section and the cable is seen to have a central core composed of a) a bundle of generally parallel conductive metal strands 12 of generally circular cross section, which may be of aluminum, copper, or other suitable material, and b) a sleeve or shield composed of a relatively thin plastic insulation skin 15, which is coated with plastic material and which carries conventional grounds 20 as is common in the field. This core is jacketed by an outer insulation jacket 22. The plastic used in the cable is customarily of a polyolefin, principally polyethylene, crosslinked polyethylene or ethylene propylene rubber material. Referring to FIG. 2, it is in the outer insulation jacket where the objectionable "tree formations" 19 develop because of moisture. These formations are what causes power losses. The end zones of the bundled conductive strands, such as that end zone designated by the numeral 25, see FIG. 4, extend axially from the outer insulation jacket 22. This description is in general of a type of cable often used in the field. A more complete description of power cables, while not necessary for purposes of this disclosure, is contained in U.S. Pat. No. 4,545,133. In any event, an important purpose of this invention is to introduce a flow of drying gas, which is air, preferably, and which is constrained to travel or flow axially through the cable from one end portion to the other end portion through the small longitudinally extending interstices or voids between the individual conductor strands of the bundled cable core.

Importantly, this is done without violating the integrity of the outer insulation jacket 22 anywhere between the ends of an underground cable that is deteriorating because of trapped moisture.

Figure 3:
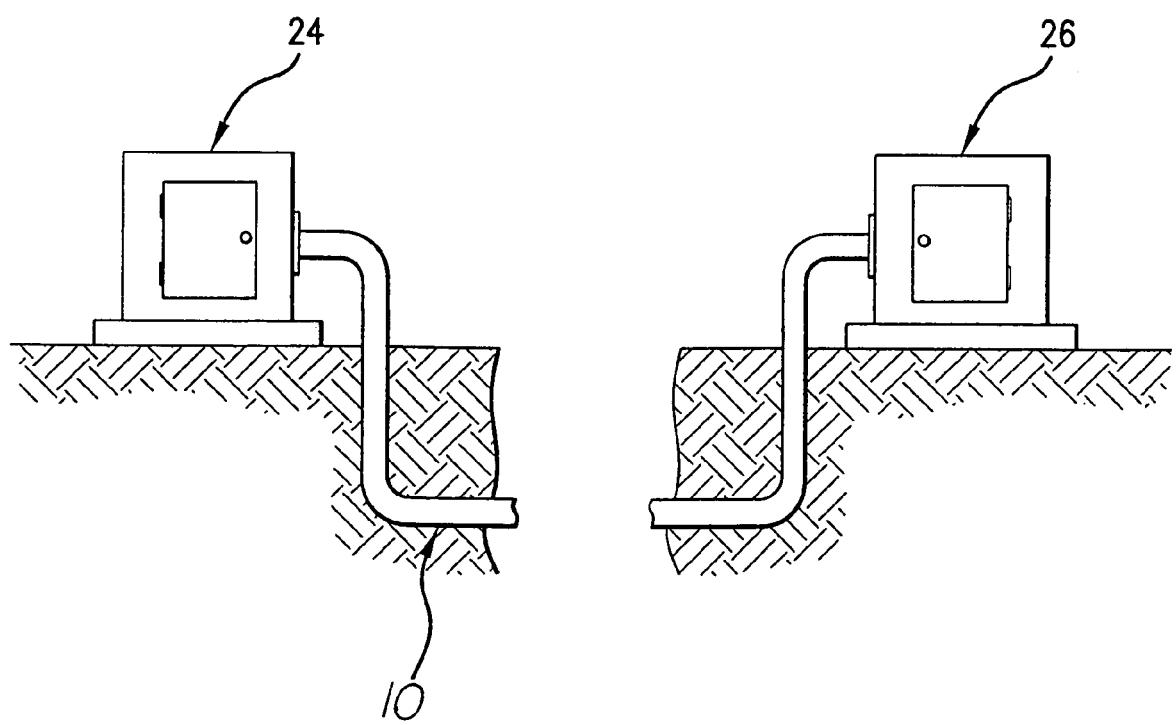
FIG. 3 is a general representation of two housings one of which is arranged about each of the ends of an underground cable of the type here involved. The housings are conventional except for the pump and gas conductive tube and connection fittings to introduce gas, whether heated or not, into the strand interstices, as described in connection with this disclosure which follows.

Referring to FIG. 3, in a network of underground or buried cable lengths, housings, or electrical cabinets, such as 24 or 26, are provided at the end of the network cable runs. At these housings, connection members, known as cable terminators, such as 30 or 30', are provided for connecting each cable run with another cable branch or terminating it. Generally, in these housings or cabinets, a terminator according to this invention is provided on the conductive and bundled conductive strand end zone of a cable. These terminators are of several different types, two of which will be described in reference to the two representative embodiments of this invention now to be described in this specification without intending to limit the invention to the precise terminator structure except as claimed.

Figure 4:
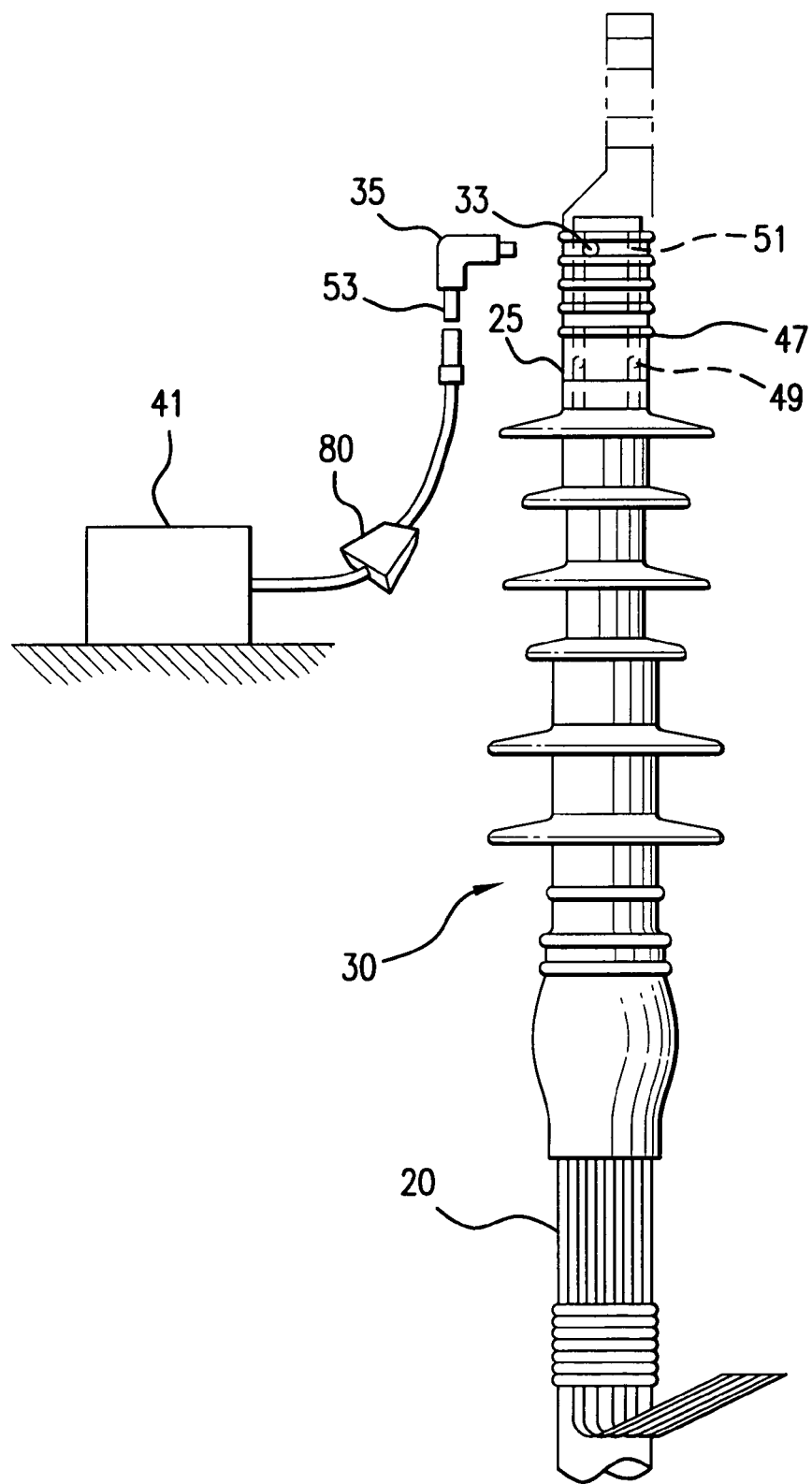
FIG. 4 is a view illustrating a first embodiment of an apparatus for conducting the process.

Referring to FIG. 4, a terminator 30 on a cable end zone is shown. In the end zone of the terminator and well into the thickness of the strand bundle, a diametrically directed tapped hole 33 is provided to a depth which is at least one half the diameter of the strand bundle. This hole opens into the cable receiving recess 51 of the terminator body. In this hole is a screw threaded connection on the threaded end of an access port fitting 35. The access port fitting is connected in fluid tight connection with tubing 53 leading to the discharge of a pump 41 to direct an air flow into some of the interstices between the electrically conductive strands. The flow state of the gas is not critical, however, its driving force or magnitude of pressure may vary, it having been determined that is important that it is persistent. For example, a pressure of three pounds per square inch above ambient pressure is adequate. Preferably, the hole 33 is for a pipe size of at least one eighth of an inch and sealing means are provided for the end zone of the cable which may be in the form of clamps 47. Additionally, O-ring seal means 49 are disposed in the recess between the terminator recess wall and the cable core. The seal means constrain the flow to a sole path, through the buried cable.

Figure 5:
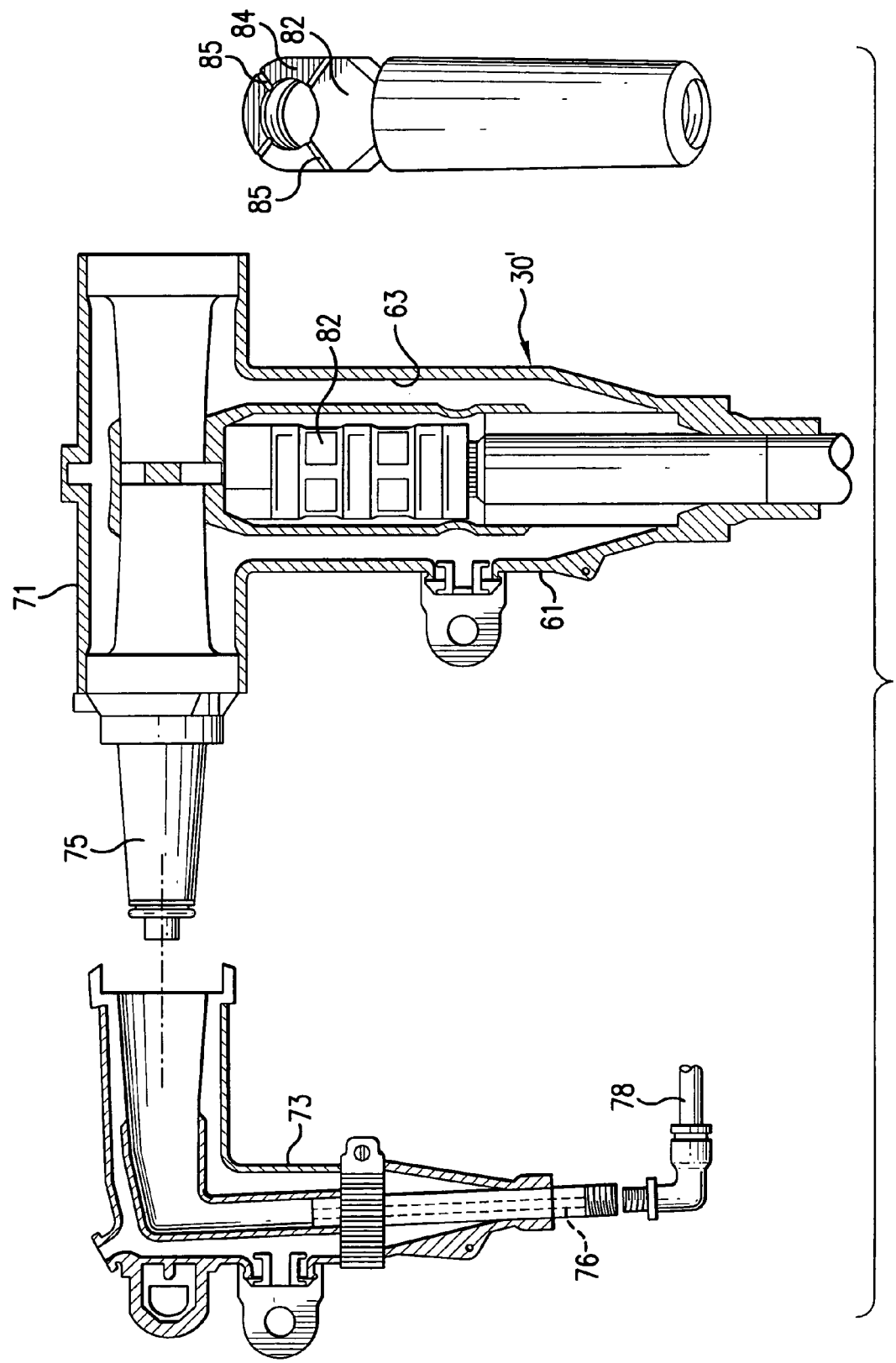
FIG. 5 is a view illustrating a second preferred embodiment.

Referring to the remaining figure, FIG. 5, a somewhat different type of terminator 30' is shown. It accommodates a branch cable in a network. It also includes a body with an incoming cable receiving recess 63 in a portion 61 which is coaxial with the cable when assembled. It also includes a lateral portion 71, which includes an adapter 73, generally. The adapter is sized and configured to mate with a plug 75 with a through recess 76 and a recess to receive tubing 78 from the pump. As mentioned above a heater means 80 may be provided between the pump and terminator body. Also, seal means are provided such as the clamp shown. In this embodiment a connector 82 is provided in the cable receiving recess. In the end face 84 of this connector, channels 85 are cut to permit fluid flow into the recess and cable's strand bundle, as shown. In this embodiment the gas is constrained by the seal means described to flow through the cable.

In use, a system for reducing moisture in the outer insulation jacket of an electrical power cable having a conductive bundle of strands which extend at the cable ends from the outer insulation jacket includes:

a) a pair of terminators at least one of which, known as the upstream terminator, has a recess sized and configured to receive and completely envelope the extending conductive strand ends of the bundle and an inlet port means involved in the seal means which, when not in use is plugged, b) sealing means to maintain the recess in the upstream terminator cable in relatively fluid tight sealed relation with the cable and in open communication with the interstices of the bundle, c) a means to deliver gas, preferably air, under an elevated low pressure relative to the ambient temperature, d) appropriate tubing and fittings to connect the pump outlet and the port means of the upstream terminator, so that the pressurized gas is constrained to a flow path through the bundle interstices to exit the cable; and, if a downstream terminator is used which is according to the disclosed terminator structure, the gas escapes through its unplugged port.

Suitable pressure sensing and control means may be provided with the tubing to measure and control the upstream and downstream pressures; and, if desired, a heater means may be provided to somewhat elevate the temperature of the pressurized gas to elevate the capacity of it to adsorb moisture.

It will be understood that, while preferred embodiments of the present invention are presented, it would be practical to vary the disclosed apparatus and process of this disclosed invention by substituting obvious equivalents to those necessary in order to describe the invention without departing from its overall spirit and scope. The concept and embodiment disclosed is of a process which teaches the gas being introduced directly into the interstices between adjacent conductive strands, whether compressed or not, at one cable end so that it flows through the entire cable length entraining and withdrawing the moisture and drying the interior and insulation gradually. Moreover, this is done without puncturing or otherwise violating the integrity of the insulation of the cable between its ends. The fittings described could be differently positioned; and, in general, numerous of the individual elements and functional aspects described may be modified somewhat within the spirit and scope of the invention which therefore should not be limited to the details of this precise disclosure; but, rather, the invention should be awarded the full range of protection implicit in the described invention. To enumerate and draw all possible variations would render this disclosure prolix. Wherefore, it will be understood that the structural elements of the apparatus disclosed necessarily in describing these embodiments can be replaced by other means which are obvious while still conforming to this invention.

Unless defined otherwise, all technical and scientific terms used herein have the same meaning as commonly understood by one of ordinary skill in the art to which this invention relates. Any methods and materials similar or equivalent to those described can be used in the practice of the present invention; and, accordingly, all equivalent structure disclosed in various publications and patents of equivalent elements of this invention are incorporated herein whether by direct reference or not.

While the principles of the invention have been made clear and are illustrated in the disclosed embodiments, it will be immediately obvious to those skilled in the art that there are many modifications of structure, arrangements, proportions, the elements, materials, and components used in the practice of the invention that are particularly adapted to specific environments and operative requirements without departing to the disclosed invention principles.

What is claimed is:

1. A system for in situ moisture removal from high voltage underground electrical power distribution cables, said system comprising:
    at least one insulated electrical cable having a core comprising a plurality of conductor strands disposed in an abutting relation to one another and defining a plurality of interstices therebetween,
    an outer insulation jacket disposed in a overlying and fluid tight relation about said core,
    said cable having spaced apart end zones, each of said end zones comprising a portion of said core extending axially outward from a corresponding portion of said outer insulation jacket,
    a plurality of electrical cabinets, each of said end zones disposed in a different one of said plurality of electrical cabinets to facilitate interconnection to or termination of said at least one insulated electrical cable therein,
    an upstream terminator having a cable receiving recess therein structured and disposed to operatively engage an upstream end zone of said cable in a fluid sealing engagement,
    said operative engagement at least partially defined by said receiving recess of said upstream terminator structured to completely receive said portion of said core extending axially outward and said corresponding portion of said outer insulation jacket therein without compromising said fluid tight relation between said outer insulation jacket and said core,
    an upstream port interconnected to said upstream terminator and disposed in fluid communication with said cable receiving recess thereof,
    a drying gas supply disposed in fluid communication with said upstream port structured to transfer drying gas into said insulated electrical cable via said upstream port while said cable is energized, said drying gas flowing through said interstices of said core of said cable along a length thereof,
    a downstream end zone of said cable structured to permit said drying gas to discharge from said cable, and
    said portion of said core extending axially outward from said corresponding portion of said outer insulation jacket of at least said upstream end zone comprises a diametrically tapped hole therein.

2. The system as recited in claim 1 wherein said core comprises a circular cross section having a diameter thereacross.

3. The system as recited in claim 2 wherein said diametrically tapped hole comprises a depth being at least one half of said diameter of said core and is structured to direct said flow of said drying gas directly into said plurality of interstices of said core.

4. The system as recited in claim 1 further comprising a downstream terminator having a cable receiving recess therein structured and disposed to operatively engage said downstream end zone of said cable in a fluid sealing engagement.

5. The system as recited in claim 4 comprising a downstream port interconnected to said downstream terminator and disposed in fluid communication with said cable receiving recess thereof.

6. The system as recited in claim 5 wherein said downstream port is structured to permit said discharge of said drying gas therethrough.

7. A system for in situ moisture removal from an energized high voltage underground electrical power distribution cable, said system comprising:
    at least one insulated electrical cable having a core comprising a plurality of conductor strands disposed in an abutting relation to one another and defining a plurality of interstices therebetween,
    an outer insulation jacket disposed in an overlying and fluid tight relation about said core,
    said cable having a plurality of spaced apart end zones, including at least an upstream end zone and a downstream end zone, each of said end zones comprising a portion of said core extending axially outward from a corresponding portion of said outer insulation jacket,
    an upstream terminator having a cable receiving recess therein structured and disposed to operatively engage an upstream end zone of said cable in a fluid sealing engagement,
    a seal disposed between said upstream terminator and said cable core at least partially defining said fluid sealing engagement,
    an upstream port interconnected to said upstream terminator and disposed in fluid communication with said cable receiving recess thereof,
    a drying gas supply disposed in fluid communication with said upstream port structured to transfer a drying gas into said insulated electrical cable while it is energized via said upstream port at a low pressure sufficient to cause said drying gas to flow through said interstices of said core of said cable along a length thereof,
    a downstream terminator having a cable receiving recess therein structured and disposed to operatively engage said downstream end zone of said cable in said fluid sealing engagement,
    a downstream port interconnected to said downstream terminator and disposed in fluid communication with said cable receiving recess thereof, wherein said downstream port is structured to permit said drying gas to discharge from said cable therethrough,
    said operative engagement at least partially defined by said receiving recess of each said terminator structured to completely receive one said portion of said core extending axially outward and said corresponding portion of said outer insulation jacket therein without compromising said fluid tight relation between said outer insulation jacket and said core,
    a plurality of electrical cabinets, each of said terminators disposed in a different one of said plurality of electrical cabinets to facilitate interconnection to or termination of said at least one insulated electrical cable therein , and
    said portion of said core extending axially outward from said corresponding portion of said outer insulation jacket of at least said upstream end zone comprises a diametrically tapped hole therein.

8. The system as recited in claim 7 wherein said drying gas supply comprises a heater structured to elevate a temperature of said drying gas above an ambient temperature prior to said transfer into said insulated electrical cable.

9. The system as recited in claim 8 wherein said temperature of said drying gas is elevated to facilitate transfer of moisture from within said insulated electrical cable into said drying gas.

10. The system as recited in claim 9 wherein said moisture is discharged from said downstream end zone of said insulated electrical cable with said drying gas.

11. The system as recited in claim 7 wherein said core comprises a circular cross section having a diameter thereacross.

12. The system as recited in claim 11 wherein said diametrically tapped hole comprises a depth being at least one half of said diameter of said core and is structured to direct said flow of said drying gas directly into said plurality of interstices of said core.

13. A system for in situ moisture removal from energized high voltage underground electrical power distribution cables, said system comprising:
   a plurality of insulated electrical cables each having a core comprising a plurality of conductor strands disposed in an abutting relation to one another and defining a plurality of interstices therebetween,
   an outer insulation jacket disposed in an overlying and fluid tight relation about said core of each of plurality of insulated electrical cables,
   said fluid tight relation at least partially defined by said outer insulation jacket being structured to substantially prevent a fluid transfer radially through said outer insulation jacket to or from said core,
   each said cable having a plurality of spaced apart end zones, each of said end zones comprising a portion of said core extending axially outward from a corresponding portion of said outer insulation jacket,
   at least some of said portions extending axially outward from a corresponding portion of said outer insulation jacket comprises a diametrically tapped hole therein structured to direct a flow of a heated drying gas directly into said plurality of interstices of a corresponding one of said cores,
   a plurality of terminators each having a cable receiving recess therein structured and disposed to operatively engage one of said plurality of end zones of said plurality of insulated electrical cables in a fluid sealing engagement,
   said operative engagement at least partially defined by said receiving recess of each of said plurality of terminators being structured to completely receive said portion of said core extending axially outward and said corresponding portion of said outer insulation jacket of said one of said plurality of end zones therein without compromising said fluid tight relation between said outer insulation jacket and said core,
   a seal disposed between each of said plurality of terminators and a corresponding one of said cable cores at least partially defining said fluid sealing engagement,
   a heated drying gas supply disposed in fluid communication with at least one of said plurality of terminators and structured to transfer said heated drying gas into a corresponding one of said plurality of insulated electrical cables through said terminator at a low pressure sufficient to cause said heated drying gas to flow through said interstices of said core of said one of said plurality of insulated electrical cables along a length thereof, and
   said drying gas discharging through another one of said plurality of terminators disposed in said operative engagement with said one of said plurality of insulated electrical cables.

14. The system as recited in claim 13 further comprising at least one electrical cabinet structured to receive at least one of said terminators of at least one of said plurality of underground electrical cables to facilitate termination of said at least one insulated of said plurality of underground electrical cables therein.

15. The system as recited in claim 13 further comprising at least one electrical cabinet structured to receive a plurality of said terminators each corresponding to different ones of at least some of said plurality of underground electrical cables to facilitate interconnection of said different ones of said plurality of underground electrical cables therein.

16. The system as recited in claim 15 wherein said at least one electrical cabinet is structured to house said heated drying gas supply therein.

17. The system as recited in claim 13 wherein said low pressure is in the range between substantially about three to five pounds per square inch.

18. The system as recited in claim 17 wherein said heated drying gas comprises air.

* * * * *